United States Patent [19] — Focht

[11] 4,275,283

[45] Jun. 23, 1981

[54] APPARATUS FOR HEATING RUBBER PRODUCTS WITH UHF ENERGY

[75] Inventor: Harry Focht, Hemmingen, Fed. Rep. of Germany

[73] Assignee: Paul Troester Maschinenfabrik, Hanover, Fed. Rep. of Germany

[21] Appl. No.: 87,715

[22] Filed: Oct. 24, 1979

[30] Foreign Application Priority Data

Oct. 26, 1978 [DE] Fed. Rep. of Germany ....... 2846610

[51] Int. Cl.[3] .......................... H05B 6/78; H05B 6/68

[52] U.S. Cl. ........................ 219/10.55 F; 219/10.55 A

[58] Field of Search ................. 219/10.55 A, 10.55 R, 219/10.55 F

[56] References Cited

U.S. PATENT DOCUMENTS 3,413,433 11/1968 Timmermans et al. ... 219/10.55 A X
3,757,070 9/1973 van Koughnett et al. ... 219/10.55 F
3,764,768 10/1973 Sayer, Jr. ...................... 219/10.55 A
4,093,840 6/1978 Jean et al. ..................... 219/10.55 F
4,099,042 7/1978 Jean et al. ..................... 219/10.55 A
4,179,595 12/1979 Chiron .......................... 219/10.55 A
4,198,554 4/1980 Wayne ...................... 219/10.55 F X

FOREIGN PATENT DOCUMENTS 2642336 1/1978 Fed. Rep. of Germany .... 219/10.55 F
2642335 4/1978 Fed. Rep. of Germany .... 219/10.55 F

*Primary Examiner*—Arthur T. Grimley
*Attorney, Agent, or Firm*—Robert E. Burns; Emmanuel J. Lobato; Bruce L. Adams

[57] ABSTRACT

Apparatus for heating continuous sponge rubber products by UHF energy to vulcanize them comprises a UHF generator connected to a resonator chamber through which the product passes by a wave guide which divides into two branches connected with the resonator chamber at spaced points. Each branch of the wave guide is tunable by a separate tuning device one of which is operable manually and the other is operated by a motor controlled by sensing probe in a circulator in the wave guide between the UHF generator and the branches. Uniform heating of the product is thereby obtained.

9 Claims, 2 Drawing Figures

APPARATUS FOR HEATING RUBBER PRODUCTS WITH UHF ENERGY

FIELD OF THE INVENTION

The present invention relates to apparatus for heating rubber products, in particular continuous extruded products in strand form for the purpose of vulcanizing them with UHF-energy. The apparatus comprises at least one resonator chamber through which the product passes, a UHF generator and a wave guide leading from the generator to the resonator chamber.

BACKGROUND OF THE INVENTION

In the technique, evermore complicated strand profiles made of rubber, in particular sponge rubber, are needed. These serve, for example, as sealing strips for doors and windows in buildings, in the automobile industry, in refrigerator construction and in many other branches of industry. These profiles have not only a complicated outer form but often have inner hollows and chambers so that in use these profile strips can be compressed to a very small volume whereby the profile itself may often assume an angle form or wave form cross section and must be so formed that it remains elastic even after long use must not tear or crack or be torn from the usual angle form support on which it is mounted. These requirements of rubber profiles, in particular sponge rubber profiles, make it necessary that the profile strand must be uniformly vulcanized throughout its cross section and over its whole length and must have no portions in which overheating or possibly even burning may have been caused by too strong local energy concentration.

Such complicated rubber profiles, in particularly of sponge rubber, can be vulcanized only in a substantially uniform UHF-energy field. UHF-energy is electromagnetic energy which lies in the range of milimeter waves, centimeter waves and decimeter waves. Such energy is for the most part produced in magnetrons and is conducted through wave guides in the form of tubular conductors of round or rectangular cross section to a resonator chamber in which this energy acts on the product to be heated and thereby vulcanized. The difficulty of heating with UHF-energy is the problem of obtaining a suitable uniform field distribution in the resonator chamber. Non-uniform distribution leads to local overheating or indeed burning or, on the other hand, to insufficient heating and thereby unvulcanized portions. Uniform field distribution is very difficult to obtain. When a uniform field distribution in an empty resonator chamber has been achieved with the help of a measuring probe, this distribution is disturbed by the product to be heated so that it becomes non-uniform.

This difficulty is also experienced in microwave ovens for heating food. In order to reduce it, it has been proposed to divide the wave guide and direct the energy into the resonator chamber by two split beams which are disposed at an angle of 90° to one another. This leads to a certain improvement in uniformity of the field because there are two fields at right angles to one another in the resonator chamber. This may be sufficient in the case of heating food. As food always contains water, no burning can occur until the water is fully evaporated. This requires very substantial local concentration of energy since considerable heat is required to convert water in the fluid state to a gaseous state. It is otherwise with the heating of water-free products such as rubber products. Here the danger of the occurrence of burning at places of high energy concentration is much greater because here there is no heat of vaporization available.

SUMMARY OF INVENTION

It is an object of the present invention to provide good energy utilization by a uniform field distribution for heating rubber products, in particular for the purpose of vulcanization.

In accordance with the invention, a wave guide for transmitting energy from a UHF generator to a resonator chamber through which passes the product to be vulcanized is divided into two branches each of which is coupled with the resonator chamber. At least one branch of the wave guide is provided adjacent the location at which it is coupled to the resonator chamber with a tuning device which is so arranged that the field geometry in the resonator chamber is variable and the wave resistance of the wave guide is adjustable to conform to the microwave generator.

This tuning device works not only on one branch, but also simultaneously on the other branch. The control device affects not only the wave distribution in both branches of the wave guide but also directly the radiation characteristics of the coupling. It thus has a dual function: it changes the wave distribution and thereby the reflection in the two branches of the wave guide and the reflection or antenna characteristics of the coupling. This makes it possible to reduce the reflection to the lowest possible value and to achieve a uniform field distribution suitable for the profile type to be heated whereby a uniform heating throughout and thereby uniform vulcanization of the profile strand results through favorable energy utilization.

It is advantageous when the tuning device is a slidable short circuit plate or plug. This need not be inserted in only one branch; control devices can be provided at the end of each branch. The length of the sliding range of such short circuit slider is equal to or greater than a quarter of the wave length used.

An especially simple construction with an especially effective coupling and control is achieved when the branching is T-shaped and both branches are parallel to a wall of the resonator chamber. Here the energy coupling location is arranged at a distance from the ends of both branches which is equal to or greater than a quarter of the wave length used.

A satisfactory measuring of the tuning of the best energy utilization is achieved by a measuring probe in a circulator built into the matched absorption branch of the wave guide behind the UHF generator. A circulator is a component of UHF technique in which one wave guide introduces energy, a neighboring wave guide is coupled to conduct out energy and a third wave guide is provided in which coupled energy out of the outgoing wave guide is led back into the circulator. This third wave guide is provided with suitable resistance to avoid reflection of energy back into the generator. The essence of the circulator resides therein that it provides "one-way-coupling" whereby energy fed into the circulator is always coupled into the neighboring wave guide in a fixed unalterable direction. A circulator of this kind is usually arranged in UHF-energy apparatus behind the UHF-energy generator in order to avoid that reflection of energy to the generator can affect the generator. The present invention uses such a circulator for measurement of the reflected energy in that in the damping branch there is arranged a measuring probe which, by suitable tuning, measures a 0-value of the reflected energy. This measuring probe is used for control of an automatic tuning device which comprises a motor on the training device and a control device for the motor which is controlled by the measuring probe in the damping branch of the circulator. However, this automatic tuning device preferably has a manually operable device for detuning the tuning of the control device because it can be necessary to work in a strong uniform field distribution near the maximum of the energy utilization.

It is advantageous when the resonator chamber is fed with energy through at least one further coupling location. Then the heating energy is introduced to the material to be heated through a multiplicity of coupling locations so as to produce a uniform temperature distribution.

BRIEF DESCRIPTION OF DRAWINGS

The nature and advantages of the invention will appear more fully from the following description in conjunction with a schematic representation of an example of apparatus in accordance with the invention. In the drawings.

DESCRIPTION OF PREFERRED EMBODIMENT

Figure 1:
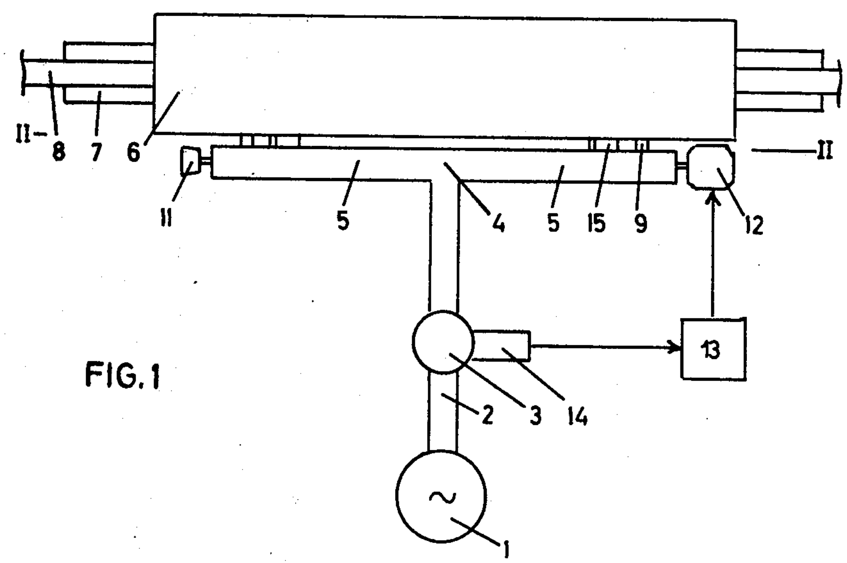
FIG. 1 is a schematic block diagram of apparatus in accordance with the invention.
Figure 2:
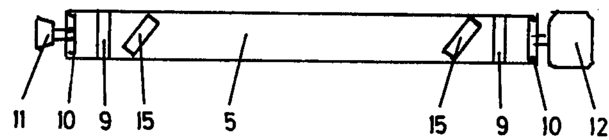
FIG. 2 is a schematic section along the line II—II in FIG. 1.

Apparatus in accordance with the invention as illustrated by way of example in the drawings comprises an elongated resonator chamber 6 through which a rubber profile 8 that is to be vulcanized is transported by a conveyor band 7 which enters the resonator chamber at one end and leaves at the other. A microwave generator 1 which produces UHF-energy is connected with the resonator chamber 6 by a wave guide 2 which is divided at a fork 4 into two branches 5 which extend parallel to the resonator chamber 6 and are coupled with the resonator chamber at coupling locations 9 which are spaced from one another longitudinally of the resonator chamber 6 and are located near opposite ends of the resonator chamber. The coupling locations 9 are located approximately half a wave length from the ends of the wave guide branches 5. UHF-energy is thereby transmitted from the microwave generator 1 to the resonator chamber 6 through the wave guide 2, branches 5 and couplings 9 between the wave guide branches and end portions of the resonator chamber 6. As illustrated in FIG. 1, the wave guide 2 is perpendicular to the branches 5 so as to form a T-shaped configuration.

A circulator 3 is connected in the wave guide 2 between the microwave generator 1 and the branching point 4. As described above, the circulator 3 permits transmission of UHF-energy in a direction from the microwave generator 1 to the resonator chamber 6 while preventing reflection of energy in the opposite direction.

At the end of each of the branches 5 of the wave guide, there is provided a tuning device 10, for example in the form of a short circuiting slider. In the branch which extends toward the left side of the drawing, the tuning device 10 is operated and controlled manually by a hand grip 11. In the branch that extends toward the right, the tuning device 10 is operable by an electric motor 12. This electric motor is controlled by a control device 13 which in turn is controlled by a measuring probe in the damping branch 14 of the circulator 3. By the hand grip 11 in the case of the left-hand branch and by the motor 12 in the case of the right-hand branch, the short circuiting sliders comprising the tuning devices 10 can be moved lengthwise of the respective wave guide branches 5 so as to tune the wave guide branches and thereby control the distribution of UHF-energy transmitted to the resonator chamber 6. As described above, the range of movement of the sliders is equal to or greater than one quarter of the wave length of the UHF-energy that is used. Adjacent the coupling 9 of each branch of the wave guide to the resonator chamber 6, there is shown provided a further coupling 15 which increases the coupling between the wave guide and the resonator chamber.

The UHF-energy produced in the microwave generator 1 is transmitted through the wave guide 2, the circulator 3 and branches 5 to the resonator chamber 6. Energy reflected from the ends of the wave guide branches 5 is transmitted back through the branches and the junction point 4 to the circulator 3 and the damping branch 14 of the circulator. The UHF-energy transmitted in the branches 5 is fed through the couplings 9,15 to the resonator chamber 6 where it forms a UHF field that serves to heat the product strand 8 that is transported through the resonator chamber by the conveyor band 7. A favorable field distribution can be obtained by sliding the short circuiting sliders 10. This can be done manually by the hand wheel 11 or by motor through the motor 12. The motor is activated by the control device 13 until the senser in the damping branch 14 of the circulator 3 shows a minimum value of reflected UHF-energy in the circulator. Maximum energy is thereupon fed to the resonator chamber 6. However, this does not necessarily mean that there is the most uniform field distribution over the cross section of the material to be heated. This can lie near such maximum. Hence, after the automatic control, it may be desirable in some instances to effect a manual "detuning" by means of the hand wheel 11.

While a preferred embodiment of the invention has been illustrated in the drawings and is herein particularly described, it will be understood that modifications and variations may be made. For example the tuning device for tuning the wave guide branches can be in the form of a variable inductive or capacitive impedance. Also while the two branches of the wave guide are shown as being in line with one another, they can join each other in an angle less than 180°. Still other variations will occur to those skilled in the art. The invention is thus in no way limited to the illustrated embodiment.

What is claimed is:

1. Apparatus for heating strand-form rubber products to vulcanize them, comprising an elongate resonator chamber, means for transporting said products through said resonator chamber in a direction lengthwise of said chamber, a microwave generator for producing UHF-energy, means for conducting said UHF-energy from said generator to said chamber comprising a wave guide having a trunk portion connected with said generator and divided at a junction point into two branches, and means coupling said branch wave guides to said resonator chamber at locations spaced from the ends of said wave guide branches and spaced apart from one another lengthwise of said resonator chamber to transmit UHF-energy to said resonator chamber and thereby produce a microwave field in said chamber to heat and thereby vulcanize said product, and tuning means in at least one of said wave guide branches adjacent the coupling of said wave guide branch to the resonator chamber for varying the microwave field geometry in said resonator chamber and vary the wave resistance of said wave guide to tune said wave guide to said generator.

2. Apparatus according to claim 1, wherein said tuning means comprises a short-circuitry slider in an end portion of said wave guide branch and means for moving said slider lengthwise of said wave guide branch.

3. Apparatus according to claim 2, wherein the length of movement of said slider is at least as great as one quarter wave length of the UHF-energy produced by said generator.

4. Apparatus according to claim 1, wherein said wave guide is T-shaped with said branches parallel to a wall of said resonator chamber and said trunk portion is at least approximately perpendicular to said branches.

5. Apparatus according to claim 4, wherein the location of said means coupling said wave guide branches with said resonator chamber is spaced from the end of said respective branch a distance at least as great as one quarter wave length of the UHF energy produced by said generator.

6. Apparatus according to claim 1, wherein a circulator having a damping branch is connected in said wave guide between said generator and said branch junction point.

7. Apparatus according to claim 6, wherein said tuning means comprises a movable tuning member in said wave guide branch, a motor for moving said tuning member and means for controlling said motor including a measuring probe in said damping branch of said circulator.

8. Apparatus according to claim 1, wherein said tuning means comprises a movable tuning member in an end portion of each of said wave guide branches, means for operating one of said tuning members automatically to tune said wave guide and means for operating the other of said tuning members manually to detune said wave guide.

9. Apparatus according to claim 1, wherein said coupling means comprises two coupling passages between each of said wave guide branches and said resonator chamber.

* * * * *